(12) United States Patent
Isachar et al.

(10) Patent No.: US 7,564,904 B2
(45) Date of Patent: Jul. 21, 2009

(54) APPARATUS FOR AND METHOD OF DETECTION OF POWERED DEVICES OVER A NETWORK

(75) Inventors: Ori Isachar, Tel Aviv (IL); Pablo D. Cusnir, Kfar Saba (IL); Nohik Semel, Kfar Saba (IL); Daniel Sharon, Givataim (IL); Daniel Wajcer, Beit-Yehoshua (IL); Guy Millet, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 612 days.

(21) Appl. No.: 11/357,627

(22) Filed: Feb. 16, 2006

(65) Prior Publication Data

US 2006/0251158 A1 Nov. 9, 2006

Related U.S. Application Data

(60) Provisional application No. 60/677,491, filed on May 3, 2005, provisional application No. 60/678,053, filed on May 4, 2005.

(51) Int. Cl.
*H04B 3/00* (2006.01)
*H04L 25/00* (2006.01)
(52) U.S. Cl. .................. 375/257; 375/221; 375/219; 375/220; 375/222; 379/322; 379/323; 379/413; 713/310
(58) Field of Classification Search .............. 375/219, 375/220, 221, 222, 257, 258; 702/60; 379/322, 379/323, 413; 713/310
See application file for complete search history.

(56) References Cited

U.S. PATENT DOCUMENTS 4,815,119 A * 3/1989 Mills ................. 379/29.01

(Continued)

OTHER PUBLICATIONS

IEEE 802.3 Part 3: CSMA/CD access method and physical layer specifications, Section 1, pp. 314-320; Section 2, pp. 213-246; Section 3, pp. 189, 194, Mar. 8, 2002.

(Continued)

*Primary Examiner*—Phuong Phu
(74) *Attorney, Agent, or Firm*—Steven A. Shaw; W. James Brady; Frederick J. Telecky, Jr.

(57) ABSTRACT

A novel mechanism for detecting the presence of powered devices over a network. A unique, infinite pseudo-random sequence of pulses are generated and transmitted over the network to the link partner attached to the other end of the cable. At each time unit, the PSE decides whether or not to transmit a pulse at that time. Thus, the pulses generated have pseudo-random inter-pulse delays between them. In addition, each pulse is pseudo-randomly selected to have either positive or negative polarity. If the link partner is a powered device it will be in loopback mode and the transmitted pulses will be looped back to the transmitter (i.e. the PSE). The PSE, at each time unit regardless of whether or not a pulse was transmitted, opens a search window in which it listens to the RX line for the appropriate expected behavior. If a pulse was transmitted, the PSE expects to see a pulse looped back. Similarly, if no pulse was transmitted, the PSE does not expect to receive a signal during the search window. If the expected behavior is observed, a match counter is incremented, otherwise a mismatch counter is incremented. If a sufficient number of matches are received, the PSE concludes that a powered device is present on the network.

27 Claims, 6 Drawing Sheets

U.S. PATENT DOCUMENTS

| | | | |
|---|---|---|---|
| 6,218,930 B1 * | 4/2001 | Katzenberg et al. | 370/200 |
| 6,477,200 B1 | 11/2002 | Agazzi et al. | 375/233 |
| 6,643,595 B2 * | 11/2003 | Rakshani et al. | 702/60 |
| 6,762,675 B1 * | 7/2004 | Cafiero et al. | 340/10.42 |
| 6,832,168 B2 * | 12/2004 | Graves et al. | 702/60 |
| 7,203,851 B1 * | 4/2007 | Lo et al. | 713/310 |
| 2004/0064275 A1 | 4/2004 | Rakshani et al. | 702/60 |

OTHER PUBLICATIONS

K. Azadet and C.J. Nicole, "Low-Power Equalizer Architectures for High-Speed Modems," IEEE Communications Magazine, pp. 118-126, Oct. 1998.

Understanding the Cisco IP Phone 10/100 Ethernet In-Line Power Detection Algorithm, Cisco Systems Inc., 1992-2003.

* cited by examiner

APPARATUS FOR AND METHOD OF DETECTION OF POWERED DEVICES OVER A NETWORK

REFERENCE TO PRIORITY APPLICATIONS

This application claims priority to U.S. Provisional Application Ser. No. 60/677,491, filed May 3, 2005, entitled "Methods for IP Phone Detection" and U.S. Provisional Application Ser. No. 60/678,053, filed May 4, 2005, entitled "Method for Detection of Powered Devices Over A Network", both of which are incorporated herein by reference in their entirety.

FIELD OF THE INVENTION

The present invention relates to the field of data communications and more particularly relates to an apparatus for and method of detecting powered devices over a network.

BACKGROUND OF THE INVENTION

Data terminal equipment (DTE) devices include any device that can be connected to a network, ranging from computers, servers and laptops, through home appliances such as televisions, video recorders and stereos, to Internet Protocol (IP) phones and facsimile machines. Some DTE devices receive electrical power from an internal source such as a power supply or plug-type power adapter or receive electrical power from an external power source. Other devices require their electrical power to be supplied directly through the network cables. Such devices are referred to as Powered Devices (PD), while devices with power supplying capabilities are referred to as Power Sourcing Equipment (PSE) devices. When a PSE and a PD are interconnected, the PD draws its electrical power from the PSE.

In order to maintain interoperability, a PSE must not cause a malfunction when it is connected to a non powered device. A requirement of the PSE, therefore, is that it must have a method of detecting powered devices. Further, the method must be sufficiently secure so that the PSE will not source power to a non powered device. In addition, a PSE must not be fooled into sourcing power by another PSE.

Figure 1:
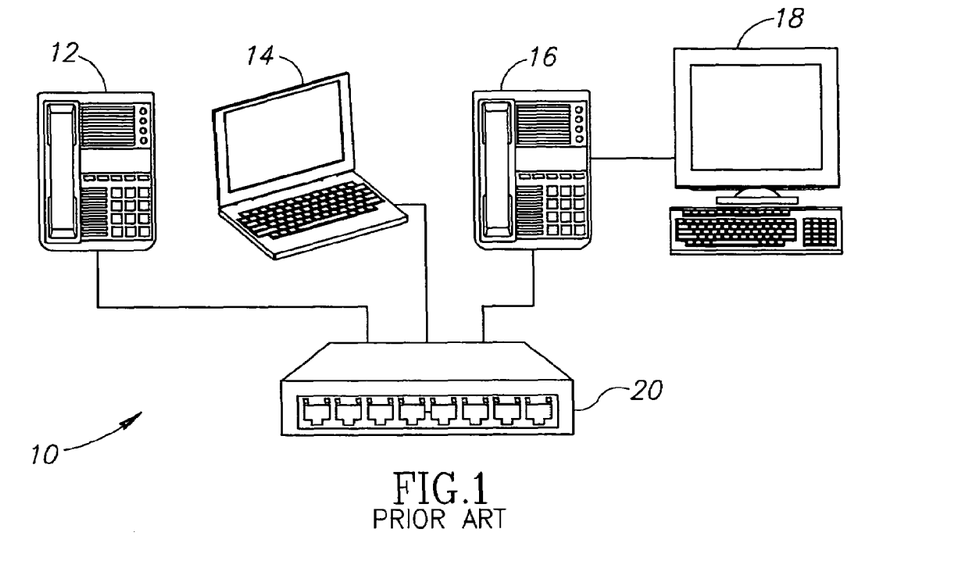
FIG. 1 is a block diagram illustrating a prior art common example of an Ethernet network topology.

A block diagram illustrating a prior art common example of an Ethernet network topology comprising IP phones, personal computers (PCs) and laptops is shown in FIG. 1. The example network, generally referenced 10, comprises IP phone 12, laptop 14 and IP phone 16, all connected to an Ethernet switch 20. Personal computer (PC) 18 is connected to the network through IP phone 16. In operation, the Ethernet switch controls the network traffic and is also responsible for sourcing power only to devices that require it, such as the IP phones.

Thus, there is a need for a mechanism for detecting the presence of power requiring devices over a communications network. The mechanism must not fool other devices so that the PSE sources power to non powered devices and it must not be fooled into sourcing power by another PSE.

SUMMARY OF THE INVENTION

The present invention overcomes the problems of the prior art by providing a novel apparatus for and method of detecting powered devices over a network. Although the mechanism of the present invention can be used in numerous types of communication networks, it is intended that a common usage of the mechanism is with Ethernet networks wherein IP phone devices are the powered devices (PDs) and Ethernet switches are the power sourcing equipment (PSEs).

The invention is operative to generate and transmit a unique, infinite pseudo-random sequence of pulses over the network to the link partner attached to the other end of the cable. At each time unit (i.e. basic time period for the detection mechanism to determine whether or not a link partner is a powered device), the PSE decides whether or not to transmit a pulse at that time. Thus, the pulses generated have pseudo-random inter-pulse delays between them. The pulse itself is a single NLP and is fixed and is much shorter than a single time unit. The length, however, can be configured to be one of several possible lengths. In addition, each pulse is pseudo-randomly selected to have either positive or negative polarity.

If the link partner is a powered device it will be in loopback mode and the transmitted pulses will be looped back to the transmitter (i.e. the PSE). Note that this occurs only when the PD is powered down, i.e. not received inline power. The PSE, at each time unit regardless of whether or not a pulse was transmitted, opens a search window in which it listens to the RX line for the appropriate expected behavior. If a pulse was transmitted, the PSE expects to see a pulse (and only one) with the correct (i.e. expected) polarity looped back. Similarly, if no pulse was transmitted, the PSE does not expect to receive a signal during the search window. If the expected behavior is observed, a match counter is incremented; otherwise a mismatch counter is incremented. Note that a pulse received outside the search window is also regarded as a mismatch. If a sufficient number of matches are received, the PSE concludes that a powered device is present on the network.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is therefore provided in accordance with the invention, a method of detecting the presence of a powered device over a network, the method comprising the steps of transmitting over the network a random sequence of pulses having a sequence length, pseudo-random inter-pulse delay and a pseudo-random pulse polarity, listening to the network for expected behavior at each time unit, declaring a match if expected behavior is observed and declaring the presence of a powered device if a consecutive number of declared matches exceeds a threshold.

There is also provided in accordance with the invention, an apparatus for detecting the presence of a powered device over a network comprising a pulse generator operative to transmit over the network a random sequence of pulses having a sequence length, pseudo-random inter-pulse delay and a pseudo-random pulse polarity, a pulse detector operative to listen to the network for expected behavior at each time unit and a controller adapted to declare a match if expected behavior is observed and to declare the presence of a powered device if a consecutive number of declared matches exceeds a threshold.

There is further provided in accordance with the invention, a communications transceiver coupled to a communications channel comprising a transmitter coupled to the communications channel, a receiver coupled to the communications channel, a powered device detector for detecting the presence of a powered device over the communications channel comprising a pulse generator operative to transmit over the communications channel a random sequence of pulses having a sequence length, pseudo-random inter-pulse delay and a pseudo-random pulse polarity, a pulse detector operative to listen to the communications channel for expected behavior at each time unit and a controller adapted to declare a match if expected behavior is observed and to declare the presence of a powered device if a consecutive number of declared matches exceeds a threshold.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ADC | Analog to Digital Converter |
| ASIC | Application Specific Integrated Circuit |
| DSP | Digital Signal Processor |
| DTE | Data Terminal Equipment |
| FLP | Fast Link Pulses |
| HDL | Hardware Description Language |
| IC | Integrated Circuit |
| IEEE | Institute of Electrical and Electronics Engineers |
| IP | Internet Protocol |
| LFSR | Linear Feedback Shift Registers |
| MSB | Most Significant Bit |
| LSB | Least Significant Bit |
| MDIO | Management Data Input/Output |
| MLT3 | Multilevel Threshold-3 |
| NLP | Normal Link Pulses |
| PC | Personal Computer |
| PD | Powered Device |
| PSE | Power Sourcing Equipment |
| RF | Radio Frequency |
| ROM | Read Only Memory |

Detailed Description of the Invention

The present invention provides a novel mechanism for detecting the presence of powered devices over a network. Although the mechanism of the present invention can be used to detect powered devices over numerous types of communication networks, it is intended that a common usage of the mechanism is with Ethernet networks wherein IP phone devices are the powered devices (PDs) and Ethernet switches are the power sourcing equipment (PSEs).

To aid in understanding the principles of the present invention, the description of the powered device detection mechanism is provided in the context of an Ethernet transceiver circuit that can be realized in an integrated circuit (IC). The powered device detection mechanism of the present invention has been incorporated in an Ethernet IC adapted to provide 10Base-T, 100Base-TX and 1000Base-T communications. In addition, the invention is described in the context of the Ethernet transceiver circuit incorporated in a power sourcing equipment comprising an Ethernet switch. It is also assumed for illustration purposes only that the powered device comprises an IP phone.

It is appreciated by one skilled in the art that the powered device detection mechanism of the present invention can be adapted for use with numerous other types of communications networks and is not limited to use only with Ethernet networks.

Note that throughout this document, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. The term Ethernet network is defined as a network compatible with any of the IEEE 802.3 Ethernet standards, including but not limited to 10Base-T, 100Base-TX or 1000Base-T over shielded or unshielded twisted pair wiring.

Figure 2:
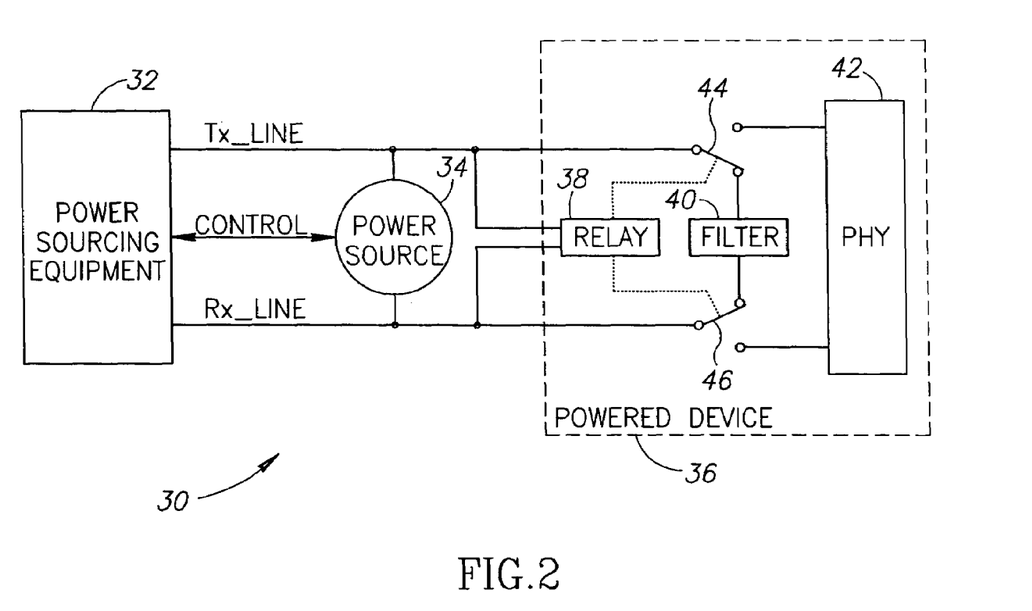
FIG. 2 is a block diagram illustrating the typical connectivity of PSE and PD devices.

A block diagram illustrating the typical connectivity of PSE and PD devices is shown in FIG. 2. The PSE to PD connection, generally referenced 30, comprises power sourcing equipment (PSE) 32, a power source 34 which may be internal or external to the PSE, and a powered device (PD) 36. The PD comprises a relay 38, optional filter 40 and PHY circuit 42. The PSE connects to the PD via the TX_line and RX_line. The power source is controlled by the PSE via one or more control lines or signals, depending on whether the power source is internal or external to the PSE.

It is assumed hereinafter, that the PD, specifically an IP phone, comprises a relay connected across the TX and RX lines. The relay connects the TX line to the RX line when the PD is not powered by the PSE. This creates a loop that returns a received signal back to the transmitting link partner. Normally, the received signal transmitted back is the same as the signal transmitted by the PSE. When the PD is powered by the PSE, the relay is opened and the loop-back is disconnected, thus enabling normal TX/RX functionality.

In accordance with the invention, the PSE determines whether its link partner is a PD or not by transmitting a unique signal or sequence of signals to it and comparing the received signal to the transmitted signal. If a match is found, then the PSE assumes that the link partner it is communicating with applied a loop-back and that it is actually a PD in an unpowered state. On the other hand, if no signal is received or the PSE detects that the link partner is transmitting to it (i.e. the PSE receives a signal but other than the expected signal), then the PSE concludes that the link partner is not a PD and does not require power.

Note that when un-powered, a PD may apply a low pass or band pass filter across the TX and RX lines in order to prevent signals at certain frequencies to be looped back. The optional filter 40 is shown in FIG. 2. If a filter is not used, a pass through connection is inserted in its place instead. Relay contacts 44 and 46 are adapted to connect the TX/RX lines to the filter when in the un-powered state and to the PHY device when in the powered state.

The mechanism of the present invention utilizes an infinite pseudo-random sequence of pulses to detect the presence of a powered device over the network. In operation, the mechanism is adapted to generate and send a sequence of pulses to the link partner on the network. If a signal is received that matches what was transmitted, it is concluded that a powered device exists. The pulses transmitted may have any suitable waveform shape. In the example presented herein, the pulses comprise pseudo-random sequences of pulses defined by IEEE 802.3 for 10Base-T links. These pulses are referred to as Normal Link Pulses (NLP). Use of NLP for the pulses used by the detection mechanism of the present invention is preferred because of several reasons: (1) NLP pulse is an IEEE 802.3 standard defined pulse, (2) the NLP transmit and receive mechanisms are already implemented in the Ethernet PHY, and (3) the electrical characteristics of the pulse are suitable for use with the detection mechanism of the invention, i.e. they can pass through the cable, both out and back, and the relay filter and be successfully received and analyzed.

The pulses generated and transmitted preferably are of programmable length, are transmitted randomly, have a random inter-pulse time delay between them and have a pseudo-random polarity. The pulse itself is a single NLP and is fixed and is much shorter than a single time unit. The length, however, can be configured to be one of several possible lengths. The time between the pulses (i.e. inter-pulse time delay) and the polarity of the pulse are preferably chosen in accordance with a 'coin flipping' algorithm. At each time unit (i.e. programmable time period), the mechanism 'flips' a coin and decides whether to transmit a pulse or not. If it is decided to transmit a pulse, the mechanism 'flips' a second coin to decide with which polarity to transmit the pulse, i.e., positive or negative polarity.

After transmitting each pulse, the mechanism opens a search window, which is a time duration in which it monitors the receive line expecting to receive one pulse having the correct polarity. The width of the window (in microseconds) is set in accordance with the longest round trip delay of the pulses along a predetermined cable length, e.g., 140 meters. If the mechanism detects a pulse (e.g., NLP, etc.) or any other energy on the receive line outside of the search window, then the detection fails and the mechanism concludes that there is no un-powered device, e.g., IP phone, on the other end of the link. A pulse outside the search window is regarded as a mismatch and causes the mismatch counter to increment. However, if the detection mechanism detects MLT3, 10Base-T idle NLP sequence or Auto-Negotiation FLPs, then the PD detection process fails.

On the other hand, if the received outcome at the end of the search window is as expected, i.e. in time and polarity, than a match is declared. The mechanism searches for a certain number of consecutive matches. This number is programmable and can be dynamically configured by the mechanism itself, an external host, etc. Further, the mechanism includes a programmable tolerance for mismatches, i.e. a configurable amount of mismatches that are allowed within the sequence of matches, which do not break the consecutiveness of any matches found. Once the required number of matches is reached, the mechanism concludes that the link partner is in fact a powered device, e.g., IP phone, and sets a bit which can be read through the Management Data Input/Output (MDIO) interface.

It is noted that the infinite sequence length, random inter-pulse delay and random polarity, in combination with the configurable search window for matching received pulses, as taught by the present invention, significantly reduce the probability of false detection. The high programmability of the mechanism permits a large degree of flexibility in implementing the mechanism in different scenarios.

Figure 3:
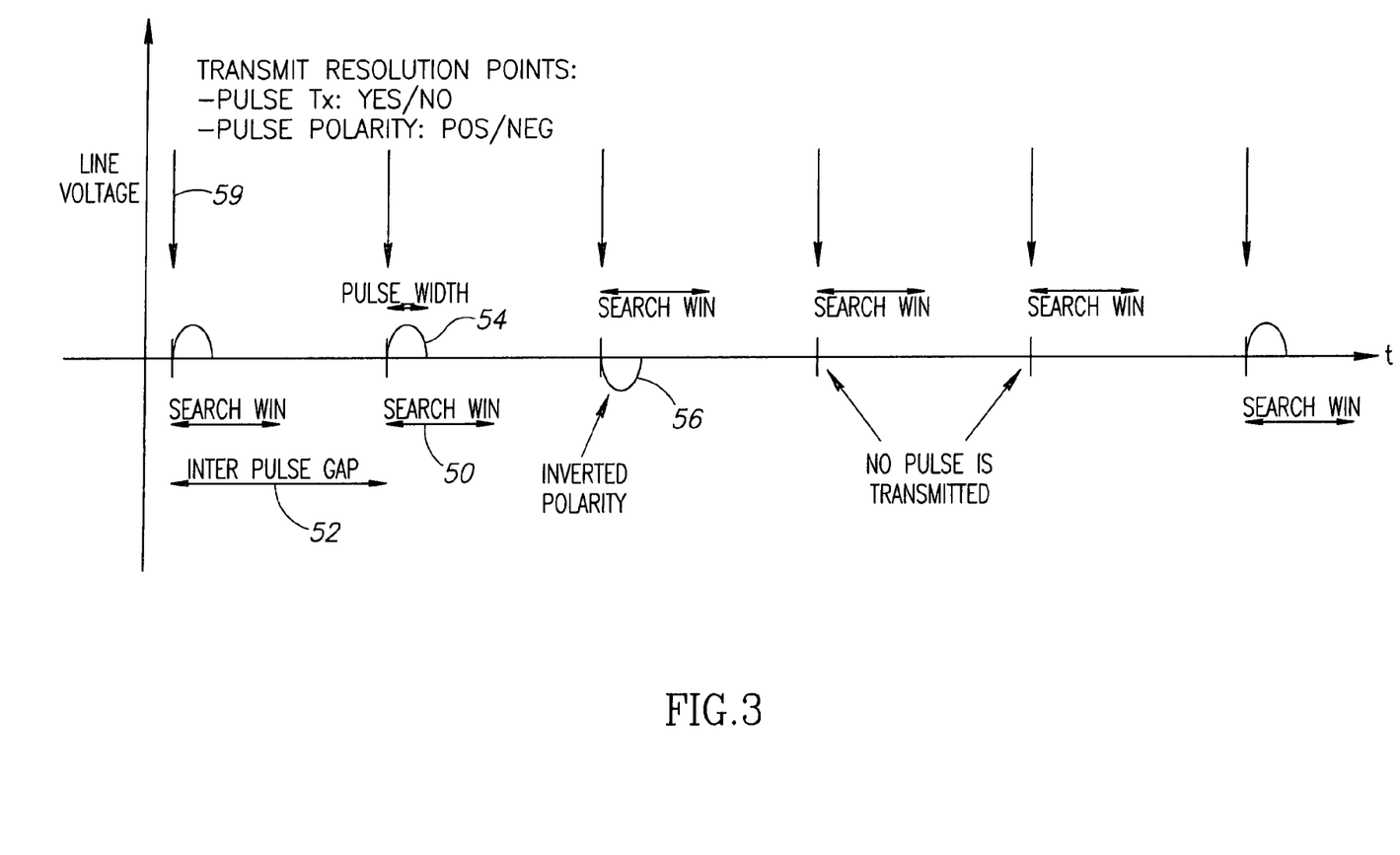
FIG. 3 is a diagram illustrating the IP phone detection transmission sequence of the present invention.

A diagram illustrating the IP phone detection transmission sequence of the present invention is shown in FIG. 3. As described hereinabove, the pulses of the infinite sequence are transmitted randomly each with random polarity. At each time unit (denoted by the vertical downward arrows 59) it is randomly determined whether to transmit or not. For each transmission time, a pulse 54 having a predetermined pulse width, e.g., NLP pulse defined by the IEEE 802.3 standard, is generated and transmitted on the TX line. Note that when the NLP pulse length is modified, the pulse is no longer an NLP but an 'extended NLP' which differs from standard defined NLP pulse. At the same time, a search window 50 is opened in which the mechanism listens to the RX line. Pulses with positive polarity are indicated with positive line voltage while pulses with negative polarity are indicated as having negative line voltage. It is important to note that regardless of whether or not it is decided to transmit a pulse at any given time unit, a search window is always opened. As described in more detail infra, if signal energy is received during this time when a pulse was not transmitted, it indicates that some other device is likely present on the line that does not require power.

Figure 4:
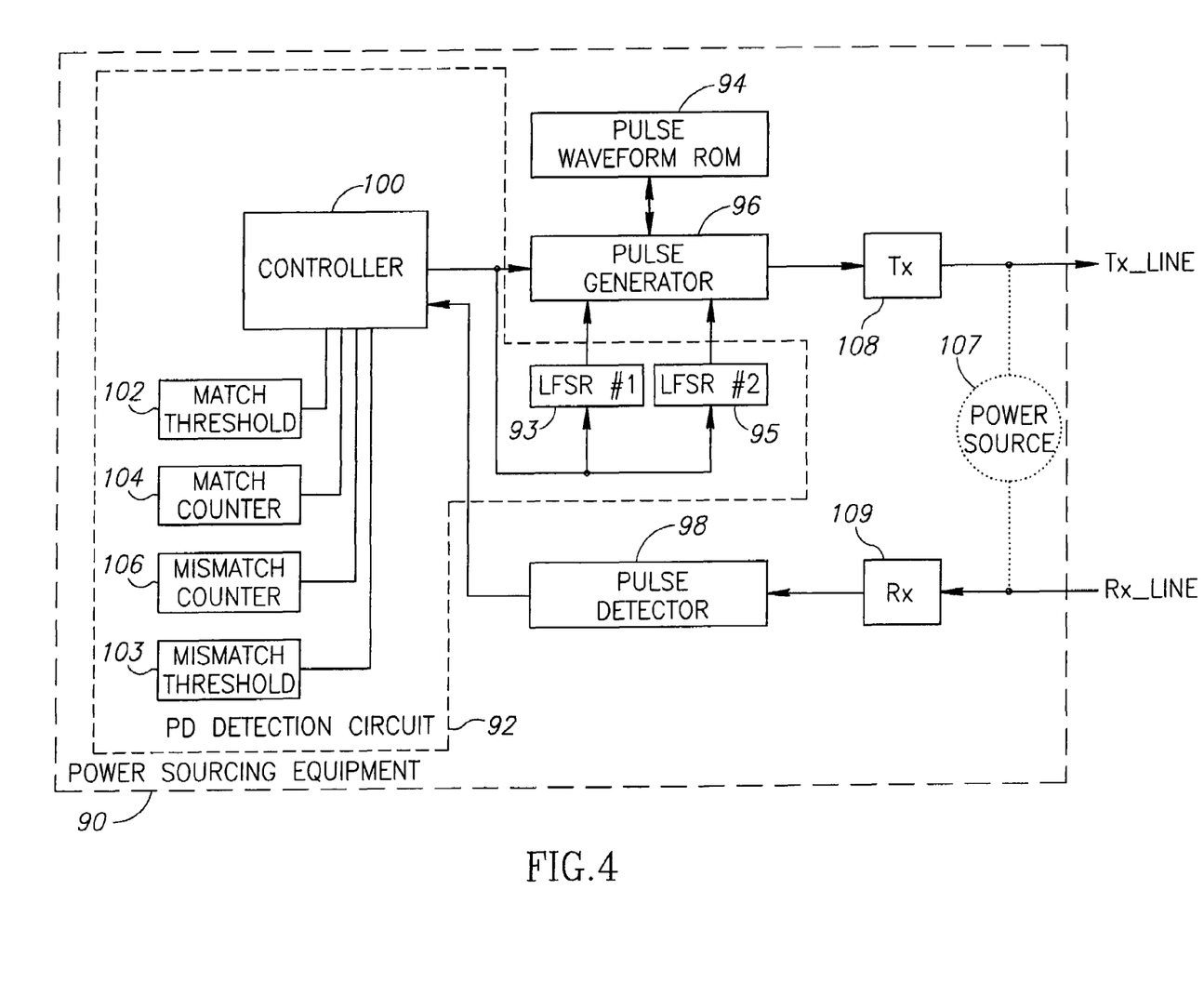
FIG. 4 is a block diagram illustrating the architecture of the power sourcing equipment device incorporating the PD detection circuit of the present invention.

A block diagram illustrating the architecture of the power sourcing equipment device incorporating the PD detection circuit of the present invention is shown in FIG. 4. The power sourcing equipment (PSE), generally referenced 90, comprises a controller 100 coupled to a match threshold 102, match counter 104, mismatch threshold 103 and mismatch counter 106, TX circuit 108, RX circuit 109, optional power source 107 and PD detection circuit 92. The PD detection circuit comprises a pulse generator 96 coupled to a pulse waveform memory 94 and random number generators 93, 95. In one embodiment, the pulse table, pulse generator and pulse detector are part of the standard 10Base-T mechanism. The PD detection mechanism uses the 10Base-T pulse generator and transmitter by sending an indication to it whenever it needs to transmit a pulse. When a pulse is received, the 10Base-T pulse detector 98 sends an indication to the PD detection mechanism. Thus, existing 10Base-T hardware is utilized in order to save silicon area and reduce design complexity of the PD detection mechanism.

Utilizing the 10Base-T block, in the transmit direction, the pulse generator, at the command of the controller, sends out a pulse generated using the pulse waveform read only memory (ROM). The waveform ROM comprises a digital representation of the analog pulse waveform, e.g., NLP pulse. The pulse is transmitted over the TX line via the TX circuit. In the receive direction, the pulse detector is adapted to listen to the RX line. The detection results are input to the controller for further processing and analysis.

During the detection of a PD, there may be other signals that appear on the receive line, depending on the particular mode of the link partner device. Example signals include, but are not limited to, 10Base-T Manchester encoded data and NLP (distanced 16±8 msec. from each other), 100Base-TX Multilevel Threshold-3 (MLT3) (IEEE 802.3u Fast Ethernet standard) encoded data or Auto-Negotiation Fast Link Pulses (FLP) which are bursts of NLPs. Note that NLP pulses may also be received in the event two devices of the same kind are interconnected.

Considering the transmit patterns described supra, both 10Base-T and Auto-Negotiation communications use NLP pulses. Thus, these types of pulses can potentially mislead the PD detection mechanism of the present invention. In the case of 10Base-T, the pulses are spaced 16±8 msec. from each other. In the case of Auto-Negotiation, the FLP pulses are sequences of 17-33 NLPs spaced 62.5-125 microseconds from each other. The distance between two consecutive FLP bursts is 5.7-22.3 msec.

In accordance with the invention, the transmitted NLP sequence of pulses is unique. To achieve this, the mechanism uses two pseudo-random number generators to determine both the timing (i.e. the decision whether or not to transmit at a given time) and polarity of transmission of each pulse in the sequence. The two pseudo-random number generators may be implemented using any suitable technique well-known in the art. The particular implementation not being critical to operation of the invention. In the representative embodiment presented herein, the two pseudo-random number generators are implemented by a pair of linear feedback shift registers (LFSR), LFSR #1 93 and LFSR #2 95 in FIG. 4. The LFSRs can be of any suitable length, e.g., 15-bits, and are initialized according to the unique physical ID of the PHY (i.e. the PHY ID) and using a plurality of bits from the analog to digital converter (ADC) to add randomization. In this manner, even if two devices of the same kind are interconnected, and restarted at the exact same time, they will transmit different pulse sequences in accordance with their PHY ID and thus will not be able to fool the other side into false PD detection. Note that it is preferable to have two different widths of the LFSR, so that they do not have the same cycle.

The PD detection mechanism of the invention selects the delay between consecutive pulses within the NLP (or other) sequence to be greater than 139 microseconds but less than 8 milliseconds. The inter-pulse delay is chosen to be larger than 139 microseconds, which is the maximum delay between pulses within an FLP burst, in order to prevent NLP pulse sequence of the PD mechanism from being incorrectly identified as an FLP by the link partner. Similarly, the inter-pulse delay is chosen to be less than 8 milliseconds, which is the minimum delay between NLP pulses in a 10Base-T sequence, in order to prevent the NLP sequence from mistakenly fooling the link partner (or the local device) into establishing a 10Base-T link ("Parallel Detection" as described in the IEEE 802.3 standard, clause 28).

The PD detection method of the invention may be self controlled or may be a controlled mechanism that is enabled and configured through management accessible registers (e.g., MDIO accessible registers). By default, the mechanism is disabled and control or management entity is responsible for enabling it and periodically polling the relevant registers for status. Note that the PD mechanism may operate regardless of whether standard Auto-Negotiation is enabled or not. The IEEE 802.3 automatic crossover (MDI/MDI-X) detection mechanism can be enabled regardless of whether the PD detection mechanism is operative or not. Note also that when determining the nature of a link partner, i.e. whether a powered device or not, the PD detection mechanism sets a pass/fail status bit and may disable itself during operation in certain circumstances and resume normal IC functionality.

The PD detection mechanism uses several programmable parameters, including:

Algorithm Related Parameters:

1. cfg_step_timescale—This is the basic time unit of the detection mechanism. This value configures the minimum allowed delay between transmissions of consecutive NLPs.

2. cfg_pd_detect_th—The threshold for the number of consecutive matching received NLPs required in order to conclude that the link partner is a powered device (e.g., IP phone). Note that the mismatch threshold is also configurable.

3. cfg_max_pd_undetect_wd—The maximum time for the detection mechanism to determine whether or not link partner is a powered device (e.g., IP phone).

Transmitted Pulse Parameters:

4. cfg_pulse_width—The configurable width of the NLP pulse transmitted.

5. cfg_pd_shape—This parameter controls the shape of the transmitted NLP pulse.

Receive Pulse Parameters:

6. cfg_nlp_rx_threshold—The threshold of the NLP detector gain.

7. cfg_nlp_rx_time—The timer threshold of the NLP detector timer which controls the receiver sensitivity to the width (i.e. time) of the received pulses.

Figure 5:
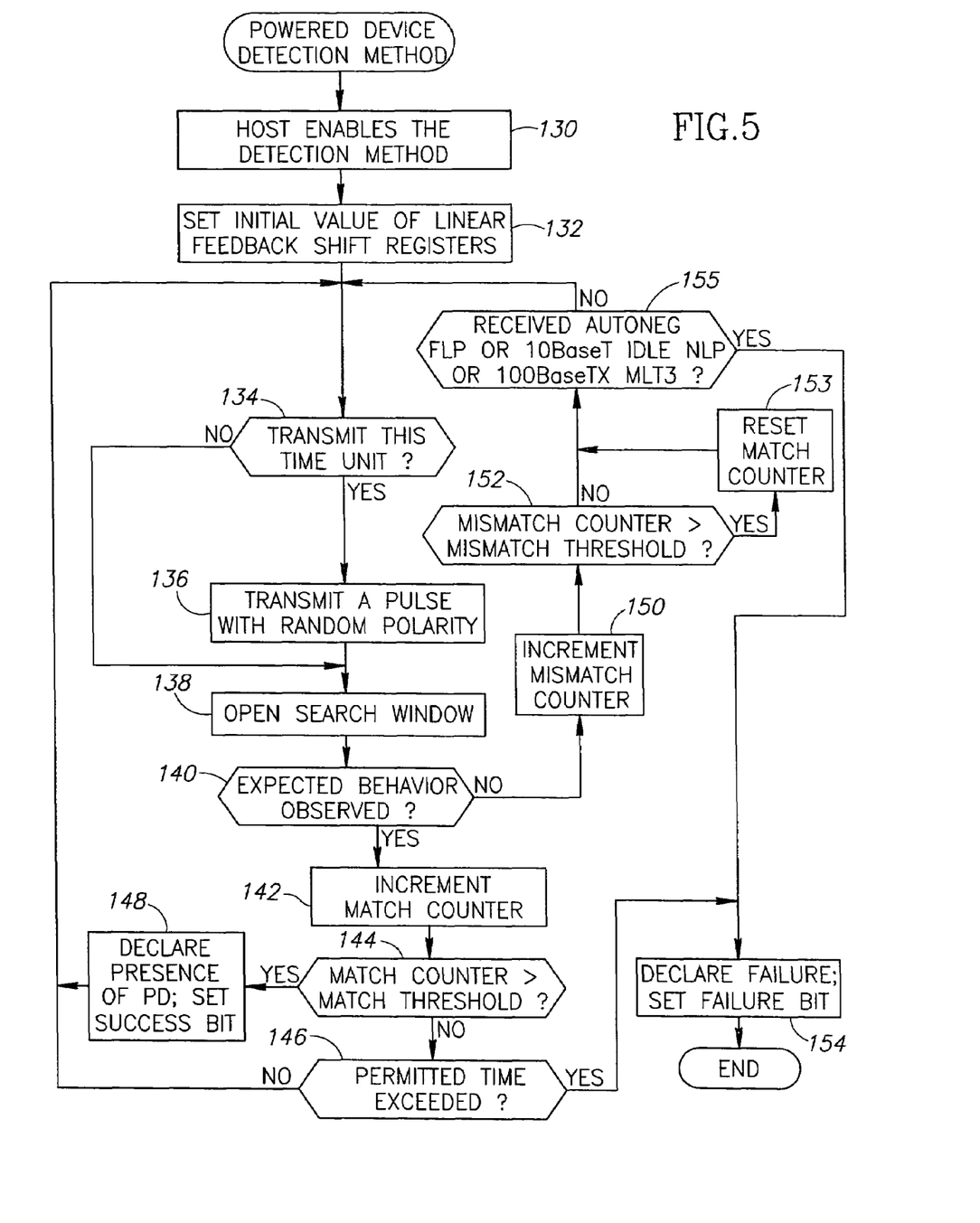
FIG. 5 is a flow diagram illustrating the powered device detection method of the present invention.

A detailed description of the flow of the PD detection mechanism will now be presented. A flow diagram illustrating the powered device detection method of the present invention is shown in FIG. 5. First, the host enables the PD detection mechanism (step 130). This can be done in any suitable manner, such as by writing or setting a management register bit. The initial values of the pseudo-random number generators (i.e. the linear feedback shift registers) are configured in accordance with the unique PHY ID of the device and a plurality of analog to digital converter bits to add randomization (step 132). At each time unit, the mechanism decides whether or not to transmit a pulse (step 134). A coin flipping algorithm may be used to determine this. In the case of LFSRs, the least significant bit (LSB) of the shift register is used to determine whether to transmit (e.g., a '0' indicates no transmission, while a '1' indicates transmission. Note that the time unit duration is configurable and is set by the cfg_step_timescale parameter. If a pulse is to be transmitted, it is generated and transmitted onto the TX line (step 136).

Regardless of whether a pulse was transmitted, at each time unit, a search window is opened (step 138). If a pulse was transmitted, the mechanism expects a pulse to be received on the RX line. If a pulse was not transmitted, the mechanism does not expect to receive any signal on the RX line. If the expected behavior is observed (step 140), a match is declared and the match counter is incremented (step 142). Note that the number of required matches is configured using the match threshold register 102 (FIG. 4). If unexpected behavior is observed (i.e. signal outside the search window or signal within the search window when no pulse was transmitted or excessive pulses within search window), the mismatch counter is incremented (step 150). If the value of the mismatch counter exceeds the mismatch threshold (step 152), the match counter is cleared (step 153) and the PD detection process continues. Each time unexpected behavior is observed, the mechanism checks whether the link partner is transmitting Auto-Negotiation FLP pulses, transmitting 10BaseT idle NLP pulses or transmitting 100BaseTX MLT3 pulses (step 155). If any of these transmissions are observed or if the watchdog timer expires, a failure is declared and the failure bit is set in the management registers (step 154). The use of the mismatch counter is optional and permits a certain amount of unexpected behavior. Thus, a perfect string of consecutive matches is not required to conclude a powered device is present. The number of allowed mismatches is set using the mismatch threshold register 103 (FIG. 4).

If the value of the match counter exceeds the match threshold (cfg_pd_detect_th) (step 144), the mechanism declares the presence of a powered device (e.g., IP phone) and sets the success bit in the management register file (step 148). If a cfg_pd_detect_th number of matches are not achieved within a predetermined amount of time (set by cfg_max_pd_undetect_wd) (step 146), the fail status bit is set in the management registers and the mechanism may optionally disable itself and resume normal chip functionality (step 154). Note that at any time during PD detection, if it is determined that the link partner is transmitting MLT3, 10Base-T Idle NLPs or performing Auto-Negotiation, the PD detection process is immediately stopped and the mechanism either stays in fail mode or permits the device to resume normal functionality (e.g., Auto-Negotiation or link establishment).

Note that in the example presented herein, the time unit is configurable and may be 200, 300, 400 or 500 microseconds. The search window is configurable as well and may be 2, 3, 4 or 5 microseconds wide. The width of the NLP may be 100, 200, 400 or 800 nanoseconds. The detection watchdog timer is configurable and may be set to 256, 512, 768 or 1024 milliseconds. The parameters match threshold and mismatch threshold are also configurable and may be up to 4095 consecutive matches. Note that these parameters are provided as an example and may be modified in accordance with the particular implementation. The actual values selected may be chosen empirically or my measurement. A match threshold of 1000 or 2000 consecutive matches provides a reasonable assuredness that a powered device is actually present as the likelihood of a false detect is extremely low with such a high threshold.

Figure 6:
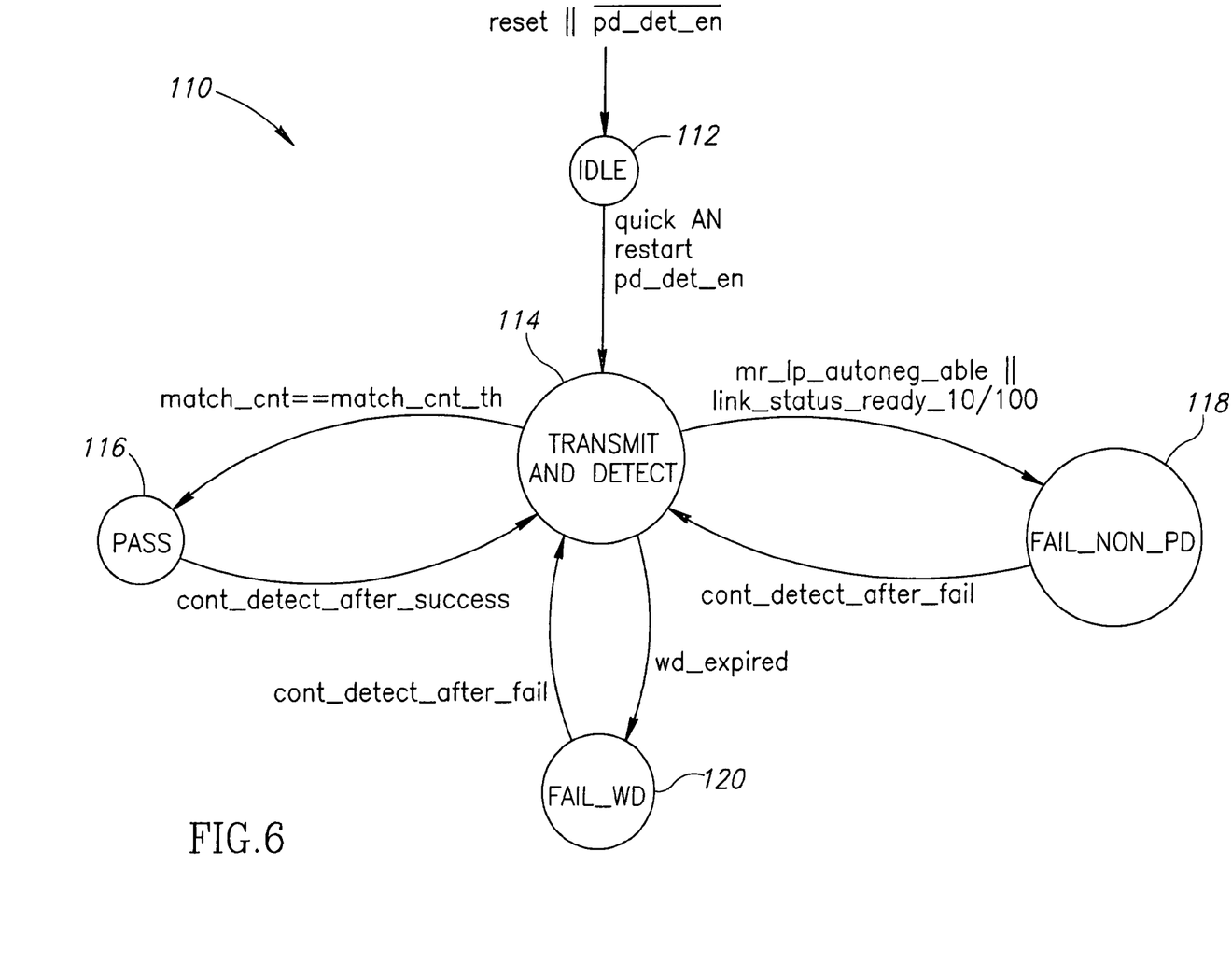
FIG. 6 is a state diagram illustrating the method and logic of the PD detection circuit of the present invention.

A state diagram illustrating the method and logic of the PD detection circuit of the present invention is shown in FIG. 6. A reset or disable signal initializes the mechanism to the IDLE state 112. A PD enable or AN enable or a restart puts the mechanism in the TRANSMIT AND DETECT state 114. In this state, the initial values of the LFSRs are set; each time unit, the mechanism decides whether or not to transmit a pulse and if so, determines its polarity. A search window is opened and the mechanism listens to the RX line for the expected behavior. If the expected behavior is observed, the match flag is set. If the number of consecutive matches is reached, i.e. the match count match_cnt exceeds the match threshold match_cnt_th, success bit is set and the mechanism enters the PASS state 116. It is important to note that a configurable amount of tolerable mismatches does not break the string of consecutive matches.

If the watchdog timer (wd_expired) expires, the fail bit is set and the mechanism enters the FAIL_WD state 120. This state will be entered eventually if the PSE is not connected to anything (i.e. no link partner) or connected to another PSE device, since the expected number of matches will not occur.

If some other unexpected signal is detected, the mechanism enters the FAIL_NON_PD state 118. This may occur in the event the other side is attempting to auto-negotiate (i.e. transmitting FLPs) or transmitting MLT3 signal or 10Base-T Idle NLPs (spaced 16±8 ms between them).

In each case, the mechanism can be configured to continue detection after a failure or success in accordance with the parameters cont_detect_after_fail or cont_detect_after_success, respectively.

Figure 7:
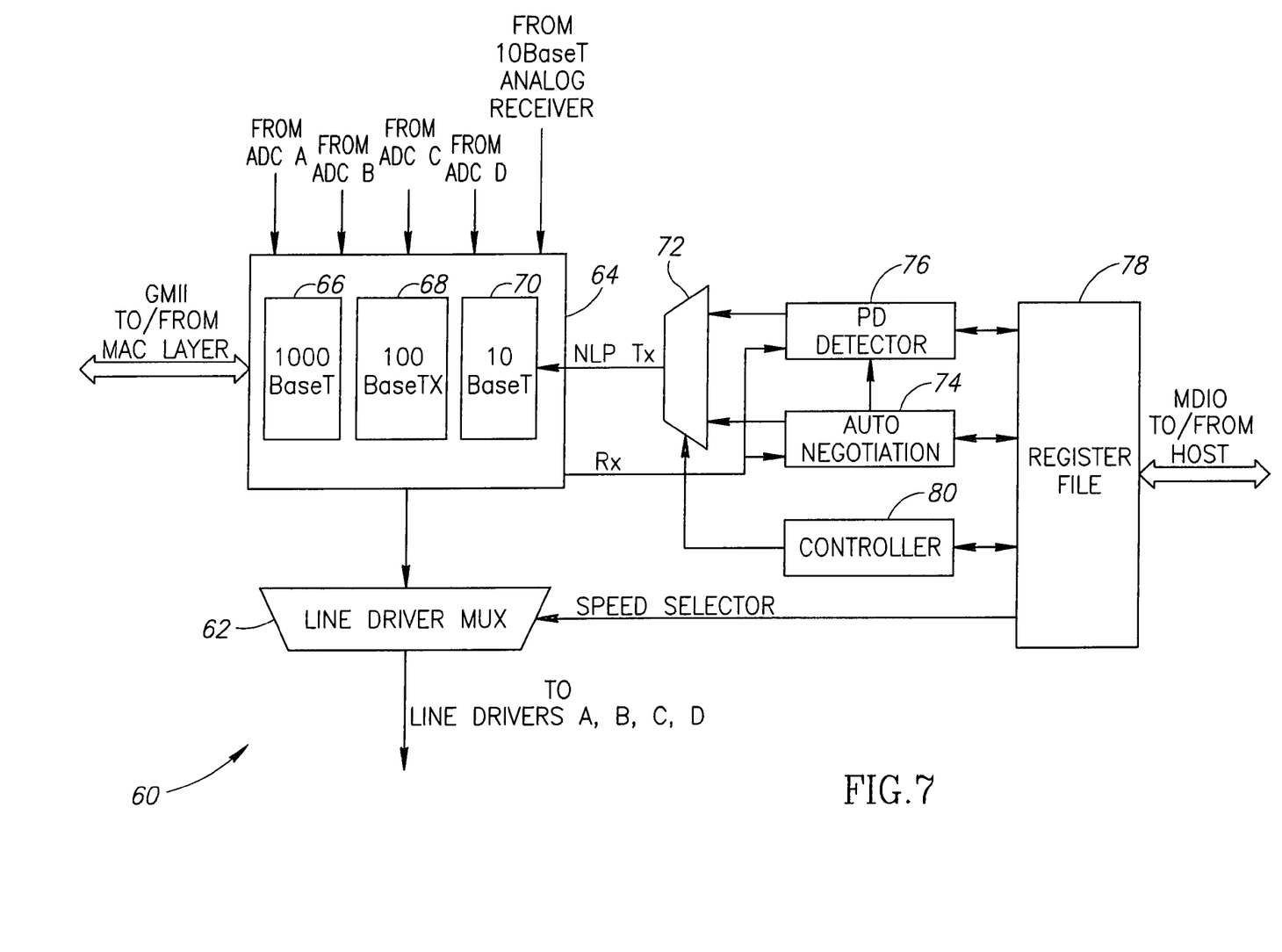
FIG. 7 is a block diagram illustrating an example Ethernet transceiver incorporating the PD detector of the present invention.

The PD detection mechanism of the present invention may be incorporated in a variety of communication devices. A typical application is to incorporate the mechanism in an Ethernet transceiver device. A block diagram illustrating an example Ethernet transceiver incorporating the PD detector of the present invention is shown in FIG. 7. The transceiver, generally referenced 60, comprises an Ethernet core 64 including 10Base-T 70, 100Base-TX 68 and 1000Base-T units, Line Driver (LD multiplexer 62 which converts the signal to analog and transmits it over the line, auto-negotiation block 74, PD detector 76 constructed in accordance with the PD detection mechanism of the present invention described in detail supra, register file 78 and controller 80.

In operation, the 1000Base-T core 66 receives data from four ADCs simultaneously (channels A, B, C, D); the 100Base-TX core 68 receives data from one ADC (channel A); and the 10Base-T core 70 receives indications from analog comparators. The transceiver 60 supports 10Base-T, 100Base-TX and 1000Base-T, all of which are defined in the IEEE 802.3 standard. The Auto-Negotiation 74 block selects the actual operating speed (e.g., 10/100/1000) by finding a highest common denominator with the link partner. Both transceivers advertise their abilities by encoding and transmitting them over the line using FLPs, and then compare their own abilities with the other device to find what they have in common. The Auto-Negotiation block can be shut down and the operating speed can be forced from a register (except for 1000Base-T, where Auto-Negotiation is mandatory). Once a link is established, packets can be sent from or received to the MAC layer using the GMII interface. Host access is performed using MDIO. Auto-Negotiation uses the 10Base-T pulses (NLP) to encode its FLP. It therefore uses the 10Base-T core receive and transmit mechanism. Similarly, the powered device mechanism of the present invention also uses the core receive and transmit mechanisms as well.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of detecting the presence of a powered device over a network, said method comprising the steps of:
    transmitting, from a transmitter, over said network a random sequence of pulses having a sequence length, pseudo-random inter-pulse delay and a pseudo-random pulse polarity;
    listening, using a pulse detector, to said network for expected behavior at each time unit;
    declaring, via a controller, a match if expected behavior is observed; and
    declaring, via said controller, the presence of a powered device if a consecutive number of declared matches exceeds a threshold.

2. The method according to claim 1, wherein the step of declaring comprises the step of tolerating a configurable number of mismatches.

3. The method according to claim 1, wherein said sequence of pulses comprises an infinite pseudo-random pulse sequence.

4. The method according to claim 1, wherein said sequence of pulses comprises a sequence of Normal Link Pulses (NLPs).

5. The method according to claim 1, wherein said pseudo-random inter-pulse delay and said pseudo-random pulse polarity are determined in accordance with a coin-flipping algorithm whereby at each programmable period of time, it is randomly determined whether to transmit a pulse and if so, randomly determines the pulse polarity.

6. The method according to claim 1, wherein said step of listening comprises opening a search window for a finite duration of time in which it is expected to receive one pulse with correct polarity.

7. The method according to claim 1, further comprising the step of declaring a mismatch if a pulse or other energy is detected outside of a search window, wherein the number of allowed mismatches is configurable.

8. The method according to claim 1, further comprising the step of declaring failed detection if a pulse or other energy is detected outside of a search window.

9. The method according to claim 1, wherein said expected behavior comprises a received pulse matching the polarity of the transmitted pulse at a particular time unit.

10. The method according to claim 1, wherein said expected behavior comprises the absence of received signal in the event no pulse was transmitted at a particular time unit.

11. The method according to claim 1, adapted to be implemented in an Application Specific Integrated Circuit (ASIC).

12. The method according to claim 1, adapted to be implemented in a Field Programmable Gate Array (FPGA).

13. An apparatus for detecting the presence of a powered device over a network, comprising:
 a pulse generator operative to transmit over said network a random sequence of pulses having a sequence length, pseudo-random inter-pulse delay and a pseudo-random pulse polarity;
 a pulse detector operative to listen to said network for expected behavior at each time unit; and
 a controller adapted to declare a match if expected behavior is observed and to declare the presence of a powered device if a consecutive number of declared matches exceeds a threshold.

14. The apparatus according to claim 13, wherein said controller comprises means for tolerating a configurable number of mismatches.

15. The apparatus according to claim 13, wherein said sequence of pulses comprises an infinite pseudo-random pulse sequence.

16. The apparatus according to claim 13, wherein said sequence of pulses comprises a sequence of Normal Link Pulses (NLPs).

17. The apparatus according to claim 13, wherein said pseudo-random inter-pulse delay and said pseudo-random pulse polarity are determined in accordance with a coin-flipping algorithm whereby at each programmable period of time, it is randomly determined whether to transmit a pulse and if so, randomly determines the pulse polarity.

18. The apparatus according to claim 13, wherein said pulse detector comprises means for opening a search window for a finite duration of time in which it is expected to receive one pulse with correct polarity.

19. The apparatus according to claim 13, further comprising means for declaring a mismatch if a pulse or other energy is detected outside of a search window, wherein the number of allowed mismatches is configurable.

20. The apparatus according to claim 13, further comprising means for declaring failed detection is if a pulse or other energy is detected outside of a search window.

21. The apparatus according to claim 13, further comprising a linear feedback shift register adapted to determine the timing of transmission of each pulse in said sequence.

22. The apparatus according to claim 13, further comprising a linear feedback shift register adapted to determine the polarity of each pulse in said sequence.

23. The apparatus according to claim 13, wherein said expected behavior comprises a received pulse matching the polarity of the transmitted pulse at a particular time unit.

24. The apparatus according to claim 13, wherein said expected behavior comprises the absence of received signal in the event no pulse was transmitted at a particular time unit.

25. The apparatus according to claim 13, adapted to be implemented in an Application Specific Integrated Circuit (ASIC).

26. The apparatus according to claim 13, adapted to be implemented in a Field Programmable Gate Array (FPGA).

27. A communications transceiver coupled to a communications channel, comprising:
 a transmitter coupled to said communications channel;
 a receiver coupled to said communications channel;
 a powered device detector for detecting the presence of a powered device over said communications channel, comprising:
 a pulse generator operative to transmit over said communications channel a random sequence of pulses having a sequence length, pseudo-random inter-pulse delay and a pseudo-random pulse polarity;
 a pulse detector operative to listen to said communications channel for expected behavior at each time unit; and
 a controller adapted to declare a match if expected behavior is observed and to declare the presence of a powered device if a consecutive number of declared matches exceeds a threshold.

* * * * *